(12) United States Patent
Vesterlund et al.

(10) Patent No.: US 6,789,984 B1
(45) Date of Patent: Sep. 14, 2004

(54) PROCESS AND APPARATUS FOR DRILLING HOLES IN THE SHELL OF A CYLINDER

(75) Inventors: Ingmar Vesterlund, Pyhäjoki (FI);
Georg Kugler, Heidenheim (DE);
Markus Oechsle, Bartholomä (DE);
Peter Kahl, Gerstetten (DE)

(73) Assignees: Pikoteknik Oy, Parhalahti (FI); Voith Sulzer Papiermaschinen GmbH, Heidenheim (DE)

( * ) Notice: Subject to any disclaimer, the term of this patent is extended or adjusted under 35 U.S.C. 154(b) by 557 days.

(21) Appl. No.: 09/351,166

(22) Filed: Jul. 12, 1999

(30) Foreign Application Priority Data

Jul. 13, 1998 (FI) .................................................. 981599

(51) Int. Cl.[7] .............................................. B23B 35/00
(52) U.S. Cl. ............................ 408/1 R; 408/51; 408/95
(58) Field of Search ........................... 408/1 R, 51, 53, 408/42, 92, 95, 712

(56) References Cited

U.S. PATENT DOCUMENTS

| | | | |
|---|---|---|---|
| 780,799 A | * | 1/1905 | Kabaker |
| 1,399,073 A | * | 12/1921 | Pahmeyer et al. |
| 1,854,053 A | * | 4/1932 | Millspaugh |
| 2,506,202 A | * | 5/1950 | Folkerth, Sr. |
| 4,674,925 A | * | 6/1987 | Thornton et al. ............ 408/1 R |
| 5,090,846 A | * | 2/1992 | Hakala et al. ............... 408/1 R |
| 5,140,749 A | * | 8/1992 | Sailas ........................ 29/895.2 |
| 5,401,232 A | * | 3/1995 | Sailas ........................... 492/38 |
| 5,927,909 A | * | 7/1999 | Parvianinen et al. ......... 408/1 R |

FOREIGN PATENT DOCUMENTS

| | | |
|---|---|---|
| EP | 0448947 | 1/1996 |
| EP | 0545879 | 5/1997 |
| FI | 91135 | 2/1994 |
| FI | 91834 | 5/1994 |
| FI | 971366 | 10/1998 |
| WO | 98/46386 | 10/1998 |

* cited by examiner

*Primary Examiner*—Henry W. H. Tsai
(74) *Attorney, Agent, or Firm*—Greenblum & Bernstein P.L.C.

(57) ABSTRACT

Process and apparatus for drilling holes in a shell of a paper machine cylinder, which is in its operating position. The process includes fixing a drilling apparatus to a cylinder adjacent to the cylinder to be drilled, and substantially eliminating influences of mechanical play due to structures of the adjacent cylinder prior to drilling, which includes coupling a support member to the adjacent cylinder to exert tangential forces on the adjacent cylinder, whereby the mechanical play is substantially eliminated. The apparatus includes a stationary framework supportable on the paper machine, a feed frame that is radially movable along said stationary framework relative to the shell, a drive unit, a plurality of drilling modules coupled to said feed frame, which are rotatable via the drive unit, a fixing device couplable to and adjacent cylinder, a device for eliminating influence of mechanical play due to structures of said adjacent cylinder, and support members adapted to exert tangential forces on said adjacent cylinder.

12 Claims, 5 Drawing Sheets

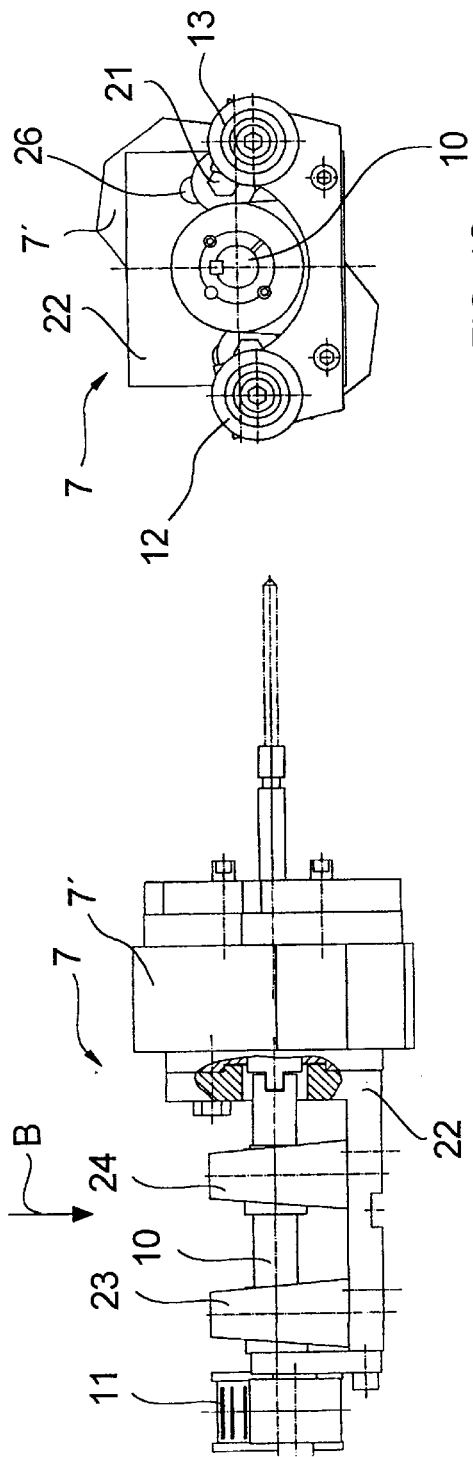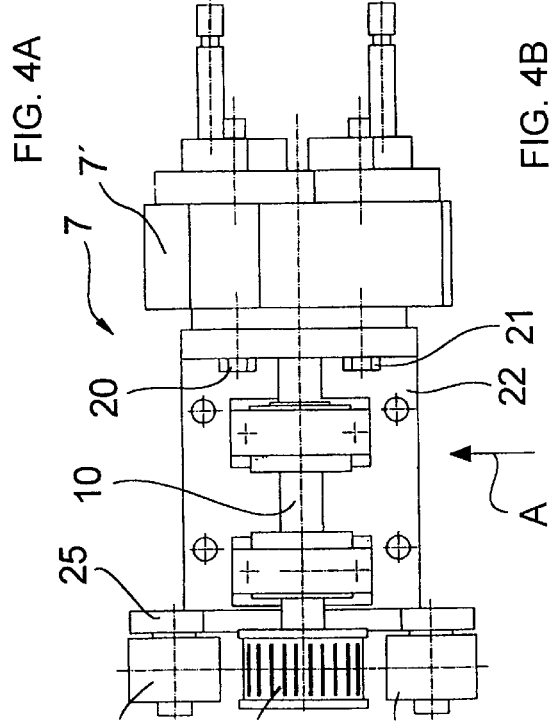

PROCESS AND APPARATUS FOR DRILLING HOLES IN THE SHELL OF A CYLINDER

CROSS-REFERENCE TO RELATED APPLICATIONS

The present application claims priority under 35 U.S.C. § 119 of Finnish Patent Application No. 981599, filed on Jul. 13, 1998, the disclosure of which is expressly incorporated by reference herein in its entirety.

BACKGROUND OF THE INVENTION

1. Field of the Invention

The present invention relates to a process for drilling holes in the shell of a paper machine cylinder, in which the cylinder remains in its operating position in the paper machine.

The invention also relates to an apparatus for drilling holes in the shell of a paper machine cylinder.

2. Discussion of Background Information

Several types of equipment are known in the art for drilling holes in the shell of a cylinder in a paper machine. Examples of some embodiments of this type of equipment are disclosed in, e.g., patent publications EP-B-0448947 and EP-B-0545879.

In EP-B-0448947, a method and an apparatus are disclosed for on-site drilling of perforating holes in the shell of a cylinder, e.g., a dryer cylinder, in a paper machine, in which the cylinder need not be removed from the paper machine. The apparatus includes a spindle box equipped with a plurality of spindle heads adapted to be driven by a drive motor. The spindle box houses the drive motor which is arranged to move the spindle box relative to a framework of the drilling apparatus when the drills are actuated toward the cylinder surface to be machined. Further, the apparatus includes a drilling jig to support and tension the framework of the drilling apparatus between guideways and the shell of the cylinder to be machined. Further, the apparatus includes slide bushings arranged to guide the framework of the drilling apparatus along the guideway assembly when the apparatus is being moved into a next drilling position in the direction of the cylinder axis. The design of the apparatus uses guideways supported on the cylinder next to the cylinder being machined.

In EP-B-0545879, a further development of the above-outlined apparatus is disclosed in which each spindle head is provided with a separate slide frame that is adapted to be individually movable in the lateral direction.

These prior art apparatuses are hampered, among other drawbacks, by their complicated construction which results in, e.g., a limited range of spindle head movement. Furthermore, the system requires the use of a drilling jig, such that each different drilling pattern requires an individual drilling jig.

SUMMARY OF THE INVENTION

The present invention provides an entirely novel type of process and apparatus for drilling the shell of a cylinder in which the above-noted drawbacks of the prior art techniques are overcome.

The present invention provides a drilling apparatus that is fixed to an adjacent cylinder so that a disturbing influence of mechanical play in the structures of the cylinder is substantially eliminated prior to drilling.

In an exemplary embodiment of the process according to the present invention, play, e.g., mechanical play, can be eliminated by applying the support member onto the adjacent cylinder so as to exert tangential forces on the adjacent cylinder.

The process according to the invention can further include applying at least one support member, which is part of the drilling apparatus, onto the cylinder being machined.

The apparatus according to the present invention includes a drilling apparatus which is fixable to the adjacent cylinder and which includes a device for eliminating the disturbing influence of mechanical play in the structures of the adjacent cylinder.

In the exemplary embodiment of the apparatus, the drilling apparatus includes support members adapted to exert tangential forces on the adjacent cylinder.

In a further embodiment of the invention, the support members may be pneumatic cylinders located within the framework of the drilling apparatus and in their operating positions, are adapted to be driven tight against the cylinder to be machined.

The process and apparatus according to the invention offer a number of significant benefits, e.g., elimination of play from the structures of the adjacent cylinder which prevents even the smallest displacement of the drilling apparatus during the drilling operation. In this manner, unwanted forces that could lead to the breaking of drills can be eliminated. The construction of the apparatus facilitates drilling without a drilling jig, and unwanted movements of the cylinder being drilled can be prevented. The arrangement according to the invention offers an application of a controllable holding force. The arrangement provides a drilling apparatus with a construction which is extremely cost-advantageous and simpler than those of the prior art.

Accordingly, the present invention relates to a process for drilling holes in a shell of a paper machine cylinder, which need not be removed from its operating position. The process includes fixing a drilling apparatus to a cylinder adjacent to the cylinder to be drilled, and substantially eliminating influences of mechanical play due to structures of the adjacent cylinder prior to drilling, which includes coupling a support member to the adjacent cylinder to exert tangential forces on the adjacent cylinder. In this manner, mechanical play is substantially eliminated.

In accordance with another feature of the present invention, the process can include coupling at least one support member of the drilling apparatus to the cylinder to be drilled. Further, the process can include pressing the at least one support member against the surface of the cylinder to be drilled. The pressing of the at least one support member exerts a tangential force to the adjacent cylinder.

According to a further feature of the present invention, the fixing of the drilling apparatus can include coupling a strap to the apparatus and positioning the strap around the adjacent cylinder.

The present invention also relates to an apparatus for drilling holes in a shell of paper machine cylinder. The apparatus includes a stationary framework supportable on the paper machine, a feed frame that is radially movable along said stationary framework relative to the shell, a drive unit, a plurality of drilling modules coupled to said feed frame, which are rotatable via the drive unit, a fixing device couplable to an adjacent cylinder, a device for eliminating influence of mechanical play due to structures of the adjacent cylinder, and support members can be adapted to exert tangential forces on the adjacent cylinder.

According to a feature of the present invention, the support members can include pneumatic cylinders coupled to said stationary framework and, in their operating position, can be adapted to be driven against said cylinder to be drilled.

According to still another feature of the invention, a curved plate, positionable against a surface of the adjacent cylinder, can be coupled to the drilling arrangement.

In accordance with a still further feature of the instant invention, the fixing device can include a strap positionable around the adjacent cylinder.

The present invention also relates to an apparatus for use in a material web producing machine that includes a cylinder to be drilled and a cylinder positioned adjacent to the cylinder to be drilled. The apparatus includes a drilling arrangement adapted for drilling a shell of a cylinder, a fixing device, coupled to said drilling arrangement, which is couplable to the adjacent cylinder to eliminate influences of mechanical play due to structures of the adjacent cylinder; and a support device can be coupled to the drilling arrangement, which is adapted to press against the cylinder to be drilled. In this manner, tangential forces may be exerted on the adjacent cylinder by the drilling arrangement.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A–4C illustrate a drilling module of the apparatus according to the invention;

DETAILED DESCRIPTION OF THE PRESENT INVENTION

Figure 1:
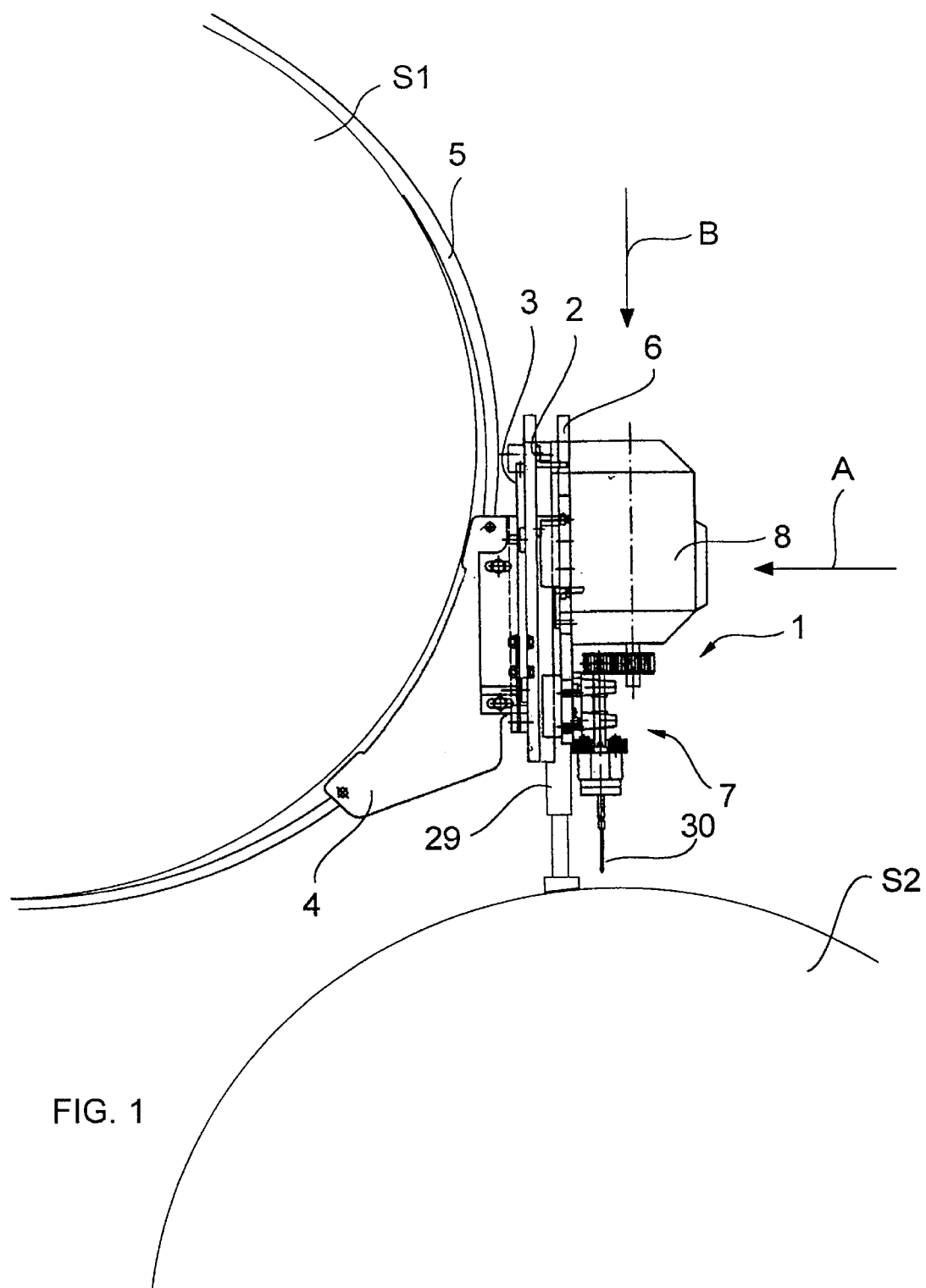
FIG. 1 schematically illustrates an apparatus according to the invention installed on site into its operating position.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the context of the present invention, the term "paper machine" is used for the purposes of explanation and illustration, but it is understood that the present invention can be utilized with other material web producing machines, e.g., a paper machine, a cardboard machine, or a cellulosic web dryer, without departing from the spirit of the invention. Moreover, the term cylinder is used to generally refer to cylindrical objects, e.g., rolls, dryer cylinders, etc.

A process according to the present invention relates to a technique for drilling holes in a shell of a paper machine cylinder s2, in which cylinder s2 is not removed from its operating position in the material web producing machine, e.g., a paper machine. In this manner, a drilling apparatus 1 can be fixed to an adjacent cylinder s1. According to the process, the disturbing influence of mechanical play in the structure of adjacent cylinder s1 can be eliminated prior to drilling by applying a support member 29 against cylinder s2 to exert tangential forces on adjacent cylinder s1. At least one support member 29, which is a part of drilling apparatus 1 is applied onto cylinder s2, which is to be machined by drilling apparatus 1. Thus, support member 29 also eliminates unwanted movement of the cylinder s2 being machined.

The apparatus according to the invention relates to equipment for drilling holes in the shell of a paper machine cylinder s2. The apparatus includes a framework 2, which is supportable on the structures of the paper machine, and a feed frame 6, supported by framework 2, which is movable toward the surface of cylinder s2 to be machined. The feed frame can include a plurality of drilling modules 7 which are drivable via a drive unit. For drilling, the apparatus can be fixed to adjacent cylinder s1 so as to eliminate the disturbing influence of mechanical play in the structure of adjacent cylinder s1. For this purpose, the drilling apparatus includes support members 29 which are capable of exerting tangential forces on adjacent cylinder s1. Support members 29 can be pneumatic cylinders coupled to framework 2 of the drilling apparatus and, in their operating positions, adapted to be driven tight against cylinder s2 to be machined.

As illustrated in FIG. 1, an exemplary embodiment of apparatus 1 according to the invention is shown in its operating position supported on the structure of a paper machine, such as a first cylinder s1 of the paper machine. Cylinder s2 to be drilled may be positioned to be laterally offset below first cylinder s1. Apparatus 1 includes a framework 2 which is supportable on the structures of the paper machine. Framework 2 can be supported on first cylinder s1 via support members 3 and 4, and support member 4 may be formed, e.g., as a curved plate resting on the shell of cylinder s1, and coupled to framework 2. Apparatus 1 can be anchored by fastening belts 5 to the surface of first cylinder s1 so that framework 2 can be aligned essentially parallel to the axis of the cylinder s1 at least over a portion of the cylinder width.

Figure 2:
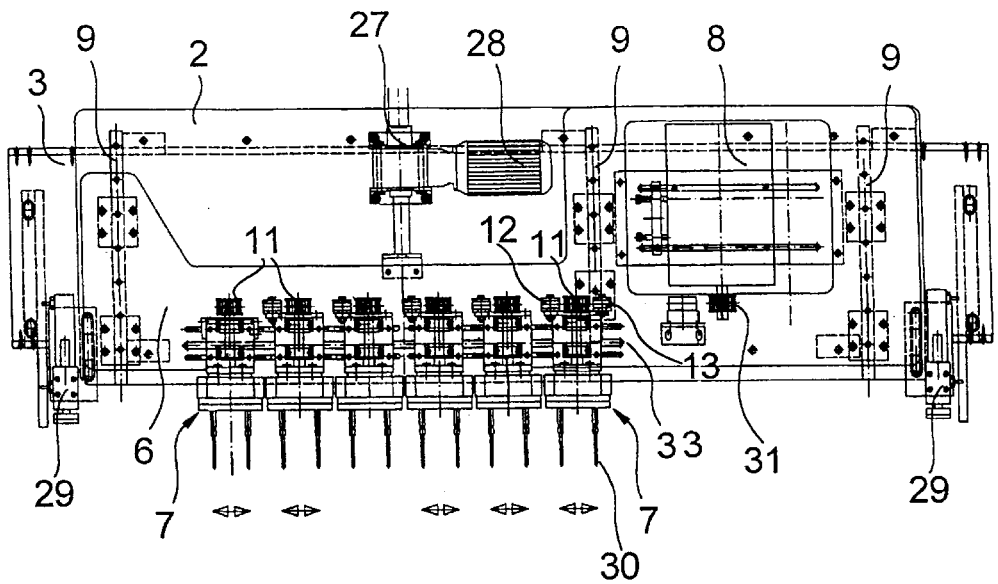
FIG. 2 illustrates a view of the apparatus according to the invention in direction II marked in FIG. 1.

Feed frame 6, which is supported by framework 2 and which is movable toward the surface of cylinder s2 being machined, may include a plurality of drilling modules 7 that are drivable via a drive unit 8. Guideways 9 can be coupled to framework 2 so that feed frame 6 can be moved along guideways 9 to provide the feed movement of drilling modules 7, as well as a withdrawal movement away from the cylinder surface after completion of the drilling step. Drilling modules 7 may include at least two spindle heads. The exemplary embodiment illustrated in FIG. 2 shows six two-spindle drilling modules 7 which can be adapted to be simultaneously driven by drive unit 8.

Each drilling module 7 includes a central drive shaft 10 which, in the exemplary illustration, is belt-driven. The belt drive train is accomplished by providing drive shaft 10 (FIG.

4A) with a belt drive pulley 11 and drilling module 7 with belt idler pulleys 12 and 13 (FIG. 4C). A first gear wheel 14 (see FIG. 5) is coupled to rotate with drive shaft 10 and adapted to drive a gear transmission 16 including an intermediate shaft 15 that further drives a spindle shaft 17. In the illustrated embodiment of FIG. 5, each drilling head 7' includes two spindle heads 18 and 18', which can be driven in the above-described manner by drive shaft 10. At least one spindle head 18 and 18' in each drilling module is arranged to be rotatable about intermediate shaft 15 and 15' of drilling head 7'. Thus, a mutual distance between spindle shaft centers 19 and 19' can be separately adjusted in each drilling head 7' by rotating at least one spindle head 18 and 18' in the drilling module about its respective intermediate shaft 15 and 15'. Furthermore, the entire drilling head 7', or at least the spindle head 18 housing spindle shafts 17 can be arranged to be rotatable about drive shaft 10, which can be performed either manually or with an appropriate control or positioning device. In this manner, it is possible to control the drilling pattern produced by each drilling head 7'. As a result, spindle shaft centers 19 and 19' of a two-spindle drilling module can be readily aligned along a desired line.

Each drilling module 7 further includes locking devices 20 and 21 (FIG. 4B) for locking drilling head 7' into a desired position. Drilling module 7 can also include a mounting plate 22 (see FIGS. 4A–4C) that is coupled to bearing assemblies 23 and 24 of drive shaft 10, as well as to support elements 25 for mounting belt idler pulleys 12 and 13. Spindle head mounting plate 22 can be provided with holes, slots or similar openings 26 for fixing drilling head 7' into a desired position via fasteners 20 and 21, e.g., screws or bolts. Drilling heads 7' can be mounted by their respective mounting plates 22 to be movable along guideway 33, which is coupled to feed frame 6. Accordingly, control of the layout or arrangement of the drilling pattern can be obtained by changing the position of drilling modules 7 along feed frame 6. In FIG. 2, such a position control possibility is indicated by arrows.

Figure 3:
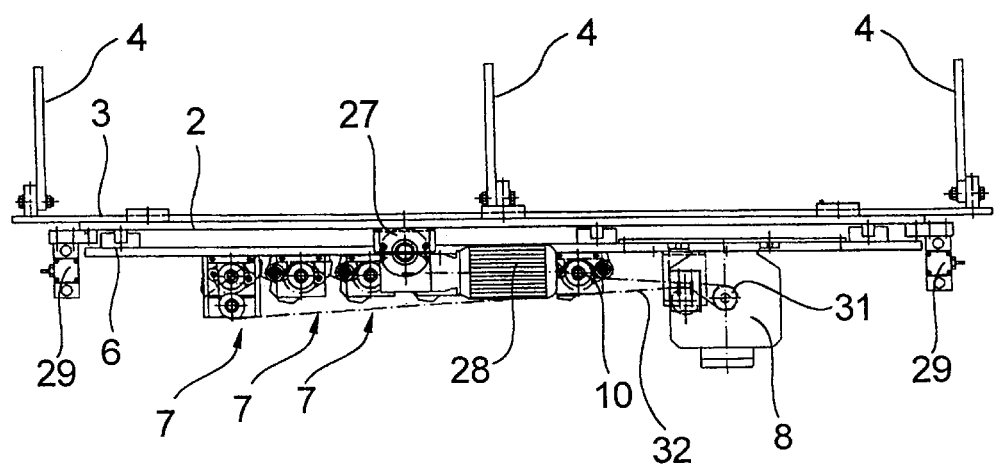
FIG. 3 illustrates a view of the apparatus according to the invention in direction III marked in FIG. 1.

In FIGS. 2 and 3, drilling apparatus 1 is schematically illustrated as coupled to framework 2. Framework 2 can include a mounting member 3 to which the curved backing plates 4 can be connected. Framework 2 may include guideways 33 for moving feed frame 6, and an actuator assembly 27 and 28 of feed frame 6, which is capable of moving feed frame 6 relative to framework 2. The actuator assembly of feed frame 6 can include a conventional screw lift (jack) 27, driven by a drive motor 28. As shown, a plurality of parallel drilling modules 7 can be coupled to feed frame 6 so as to be driven by a common drive unit 8, which is also mounted on feed frame 6.

Framework 2 can be provided with support members 29, e.g., pneumatic cylinders, which, prior to the machining operation, can be driven against the surface of cylinder s2 to be machined so as to eliminate any possible play in the manner discussed above. In particular, it is noted that the effect of any instability in the bearings of cylinder s1 and the support structures thereof, which act as a mounting base for drilling apparatus 1 can thus be minimized, whereby the drilling operation becomes very stable and, thus, more accurate. Moreover, this arrangement prevents, e.g., unwanted movements of the drilling apparatus during the drilling operation which substantially eliminates the breaking of drills 30.

The drilling operation occurs as follows: drilling apparatus 1 is mounted on cylinder s1, which is the closest adjacent cylinder to cylinder s2 to be machined, via fastening belts 5. Spindle heads 18 of drilling modules 7 can be adjusted into a desired position, so as to provide a desired distance between spindle head centers 19 and 19'. Drilling head 7' of the drilling module 7 can be rotated around drive shaft 10 if necessary to locate, e.g., align, the spindle head centers in a desired arrangement. In this regard, mutual distances between adjacent drilling modules 7 can be set as required to obtain the desired drilling pattern. Support members 29 can be driven against the surface of cylinder s2 to be machined, and, via actuator assembly 27 and 28, feed frame 6 can be moved toward cylinder s2 to be machined. Finally, rotary drive unit 8 of spindle heads 18 (and drills 30) can be switched on. After completion of drilling, these actions are repeated in a reverse order.

Cylinder s2 being machined can be rotated between the drilling steps by a rotary drive system (not shown) about a cylinder shaft, e.g., incrementally, by a given angle into a next drilling position. One such type of rotary drive system is disclosed, e.g., in patent publication EP-B-0448947, the disclosure of which is expressly incorporated by reference herein in its entirety. However, this rotary drive system can rotate the cylinder only by increments determined by the pitch of the gear wheel mounted in the drive unit. Hence, each different size of incremental angle of rotation would need a separate gear wheel. To overcome this limitation, a conventional indexing wheel can be used to convert the increment angle of rotation into a suitable value. Cylinder s2 being machined is locked into a fixed position for the duration of the machining step.

In FIG. 3, rotational drive unit 8 for drilling modules 7 is partially visible. Drive unit 8, which can advantageously be, e.g., a conventional electric motor, transmits power feed from motor output shaft 31 via a belt transmission train 32 to drive shafts 10 of drilling modules 7. In this manner, the power feed is distributed individually to each spindle head 18 carrying a drill 30.

Figure 5:
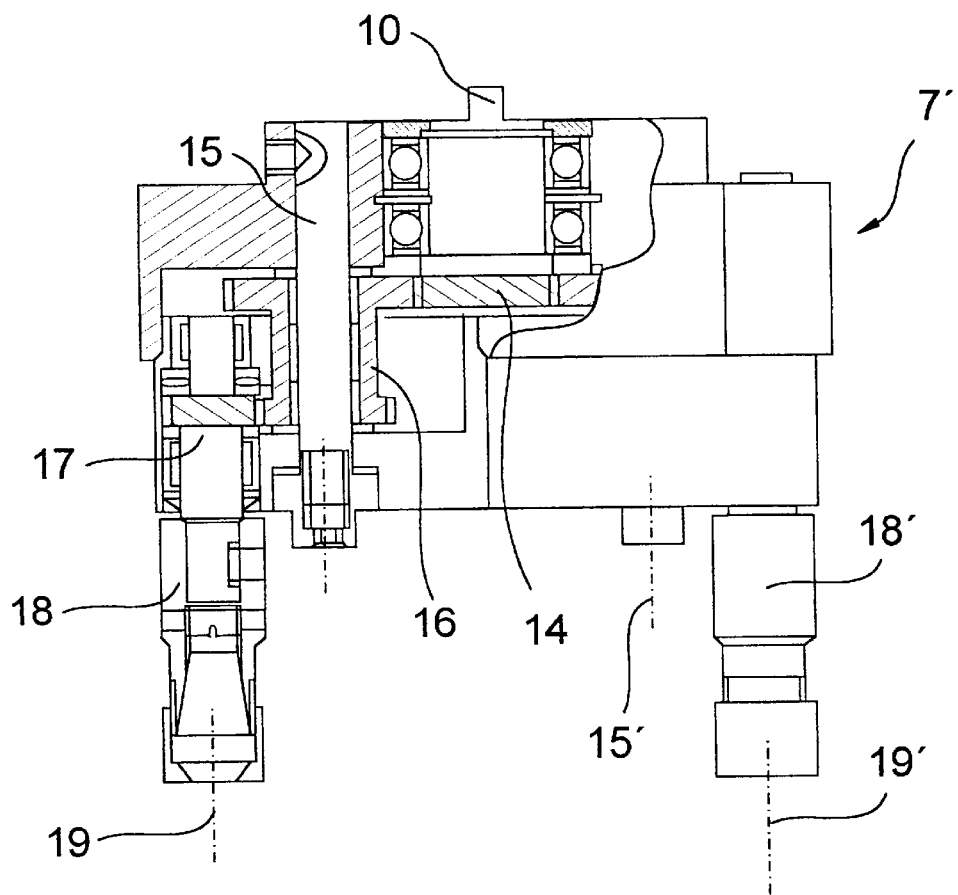
FIG. 5 illustrates a partially sectional view of a multi-spindle drilling module in the apparatus according to the invention.

In FIGS. 4A–4C one of the drilling modules 7 is depicted, and in FIG. 5 one drilling head 7' of drilling module 7 is depicted. Spindle shaft centers 19 and 19' are arranged to be rotatably adjustable about respective intermediate shafts 15 and 15'. While the illustrated embodiment shows two intermediate shafts, it is noted that this illustration is provided to facilitate understanding and should not be construed as limiting and more than two intermediate shafts can be provided.

Figure 6A:
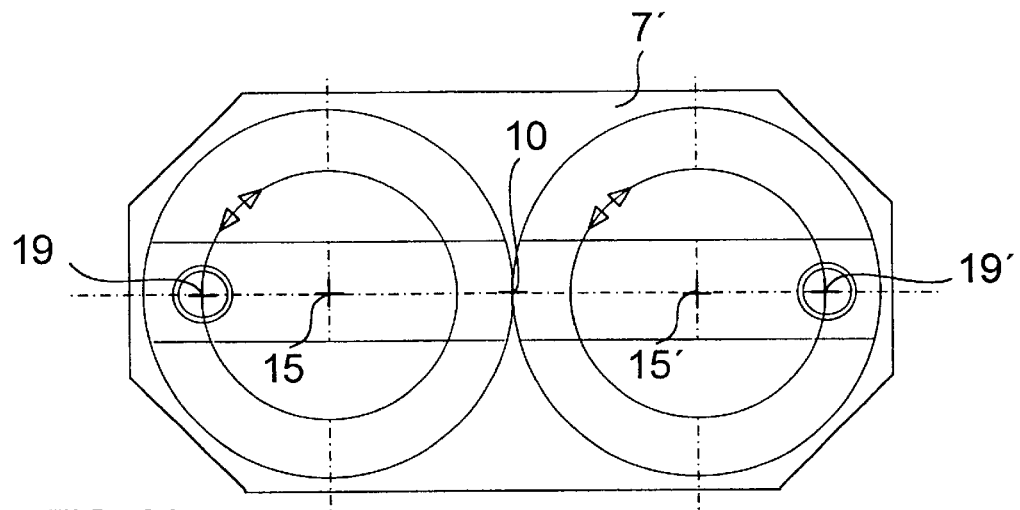
FIGS. 6A–6C schematically illustrate the position control arrangement of drills for one drilling module as seen from the direction of the cylinder being machined.
Figure 6B:
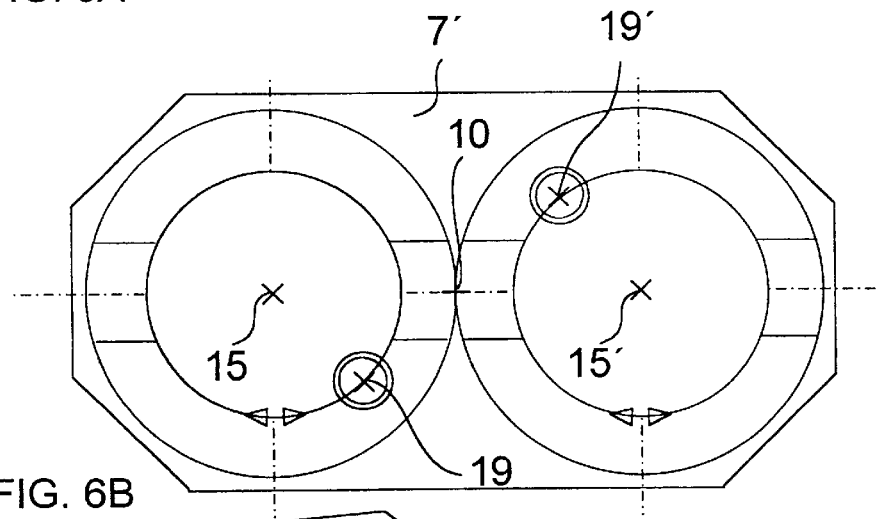
Figure 6C:
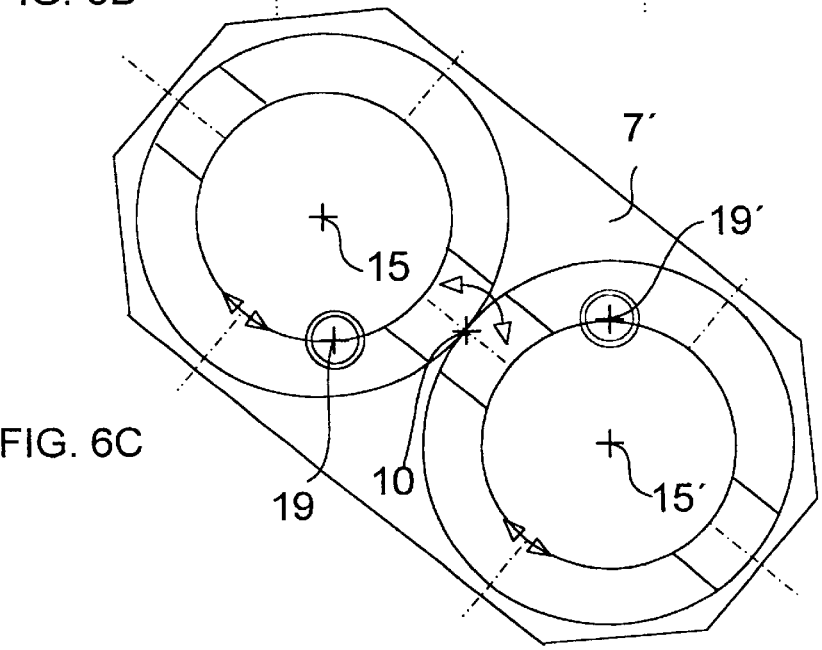

The position control of drilling module 7 is schematically illustrated in FIGS. 6A, 6B and 6C. In FIG. 6A, a mutual distance between spindle shaft centers 19 and 19' of two-spindle drilling head 7' is shown driven into a maximally outdistanced (i.e., spaced) position. However, drilling head 7' of drilling module 7 has not been rotated about drive shaft 10. In FIG. 6B, both spindle shaft centers 19 and 19' are shown rotated about respective intermediate shafts 15 and 15' so that a mutual distance between spindle shaft centers 19 and 19' becomes smaller than the arrangement depicted in FIG. 6A. However, it is also noted that the drills 30 are offset a distance from the centerline of drilling. When necessary, the drilling pattern may further be controlled by rotating the frame of drilling head 7' about center axis 10, whereby spindle shaft centers 19 and 19' can be aligned with the centerline of drilling.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for drilling holes in a shell of a paper machine cylinder, which is in an operating position, the process comprising:

fixing a drilling apparatus to a cylinder adjacent to the cylinder to be drilled; and substantially eliminating influences of mechanical play due to structures of the adjacent cylinder prior to drilling, comprising coupling at least one support member to the adjacent cylinder to exert tangential forces on the adjacent cylinder, whereby the mechanical play is substantially eliminated.

2. The process in accordance with claim 1, further comprising coupling at least one support member of the drilling apparatus to the cylinder to be drilled.

3. The process in accordance with claim 2, further comprising pressing the at least one support member against the surface of the cylinder to be drilled.

4. The process in accordance with claim 3, wherein the pressing of the at least one support member exerts a tangential force to the adjacent cylinder.

5. The process in accordance with claim 1, the fixing of the drilling apparatus comprising coupling a strap to the apparatus and positioning the strap around the adjacent cylinder.

6. An apparatus for drilling holes in a shell of paper machine cylinder comprising:

a stationary framework supportable on the paper machine;

a feed frame that is radially movable along said stationary framework relative to the shell;

a drive unit;

a plurality of drilling modules coupled to said feed frame, which are rotatable via the drive unit;

a fixing device couplable to an adjacent cylinder;

a device for eliminating influence of mechanical play due to structures of said adjacent cylinder comprising support members adapted to exert tangential forces on said adjacent cylinder.

7. The apparatus in accordance with claim 6, said support members comprising pneumatic cylinders coupled to said stationary framework and, in their operating position, adapted to be driven against said cylinder to be drilled.

8. An apparatus for drilling holes in a shell of paper machine cylinder comprising:

stationary framework supportable on the paper machine;

a feed frame that is radially movable along said stationary framework relative to the shell;

a drive unit;

a plurality of drilling modules coupled to said feed frame, which are rotatable via the drive unit;

a fixing device couplable to an adjacent cylinder;

a device for eliminating influence of mechanical play due to structures of said adjacent cylinder comprising support members adapted to exert tangential forces on said adjacent cylinder; and at least one curved plate, positionable against a surface of the adjacent cylinder, which is coupled to the stationary framework.

9. The apparatus in accordance with claim 6, the fixing device comprising a strap positionable around the adjacent cylinder.

10. An apparatus for use in a material web producing machine that includes a cylinder to be drilled and a cylinder positioned adjacent to the cylinder to be drilled, said apparatus comprising:

a drilling arrangement adapted for drilling a shell of a cylinder;

a fixing device, coupled to said drilling arrangement, which is couplable to the adjacent cylinder to eliminate influences of mechanical play due to structures of the adjacent cylinder; and a support device coupled to said drilling, arrangement which is adapted to press against the cylinder to be drilled, whereby tangential forces are exerted on the adjacent cylinder by the drilling arrangement.

11. An apparatus for use in a material web producing machine that includes a cylinder to be drilled and a cylinder positioned adjacent to the cylinder to be drilled, said apparatus comprising:

a drilling arrangement adapted for drilling a shell of a cylinder;

a fixing device, coupled to said drilling arrangement, which is couplable to the adjacent cylinder to eliminate influences of mechanical play due to structures of the adjacent cylinder;

a support device coupled to said drilling arrangement, which is adapted to press against the cylinder to be drilled, whereby tangential forces are exerted on the adjacent cylinder by the drilling arrangement; and at least one curved plate, positionable against a surface of the adjacent cylinder, which is coupled to the drilling arrangement.

12. The apparatus in accordance with claim 10, said fixing device comprising:

a strap, positionable around the adjacent cylinder, which is coupled to the drilling arrangement.

* * * * *